United States Patent [19]

Barker et al.

[11] Patent Number: 5,133,070
[45] Date of Patent: Jul. 21, 1992

[54] METHOD OF NESTING AND PROCESSING MIXED DATA OBJECTS WITHIN A DATA STREAM UTILIZING SELECTIVE ENVIRONMENT INHERITANCE

[75] Inventors: Barbara A. Barker, Round Rock; Thomas R. Edel, Austin; Jeffrey A. Stark, Grapevine, all of Tex.

[73] Assignee: International Business Machines Corporation, Armonk, N.Y.

[21] Appl. No.: 213,426

[22] Filed: Jun. 30, 1988

[51] Int. Cl.⁵ ............... G06F 15/40; G06F 15/403; G06F 15/419; G06F 15/62
[52] U.S. Cl. ............................... 395/650; 364/225.6; 364/282.1; 364/283.3; 364/284.2; 364/286.1; 364/286.2; 364/281.7; 364/281.3; 364/282.3; 364/283.1; 364/283.2; 364/DIG. 1; 364/419
[58] Field of Search ... 364/200 MS File, 900 MS File, 364/518, 300; 419; 340/721, 723, 703, 724; 395/600, 500, 650, 700

[56] References Cited

U.S. PATENT DOCUMENTS

| | | | |
|---|---|---|---|
| 4,390,945 | 6/1983 | Olsen et al. | 364/200 |
| 4,651,278 | 5/1987 | Herzog et al. | 364/300 |
| 4,663,615 | 5/1987 | Hernandez et al. | 340/721 |
| 4,672,459 | 6/1987 | Kudo | 364/518 |
| 4,688,167 | 8/1987 | Agarwal | 364/200 |
| 4,739,477 | 8/1988 | Barker et al. | 364/300 |
| 4,751,740 | 6/1988 | Wright | 364/518 |
| 4,785,296 | 11/1988 | Tabata et al. | 340/723 |
| 4,819,233 | 4/1989 | Delucia et al. | 364/200 |
| 4,829,294 | 5/1989 | Iwami et al. | 340/721 |
| 4,831,583 | 5/1989 | Pascoe | 364/900 |
| 4,965,765 | 10/1990 | Brown | 364/900 |

OTHER PUBLICATIONS

Wolfgang Horak, "Interchanging Mixed Text Image Documents In The Office Environment" vol. 7, No. 1, 1983, pp. 13-29.
D. D. Chamberlin et al., "JANUS: An Interactive Document Formatter Based On Declarative Tags" vol. 21, No. 3, 1982, pp. 250-270.

Primary Examiner—Thomas C. Lee
Assistant Examiner—Daniel H. Pan
Attorney, Agent, or Firm—Andrew J. Dillon

[57] ABSTRACT

A method is disclosed for nesting and processing mixed data objects from diverse data types including: text, image, and graphics. The method permits the utilization of shared environmental specifications for processing multiple data objects. Each mixed data object includes a pair of object delimiters, which identify the beginning and end of that object, and an environment control indicator which determines whether that object will inherit environment objects from a nesting object or pass environment objects to the nesting object. An appropriate application for processing each object is called in response to the detection of the beginning of that object and is returned to after any intervening objects have been processed. Processing is accomplished utilizing environment elements from the current object or a previous object so that coordinate systems, color, units of measure or current positions may be shared between objects while allowing specific applications suited to a particular object to be utilized for processing.

10 Claims, 3 Drawing Sheets

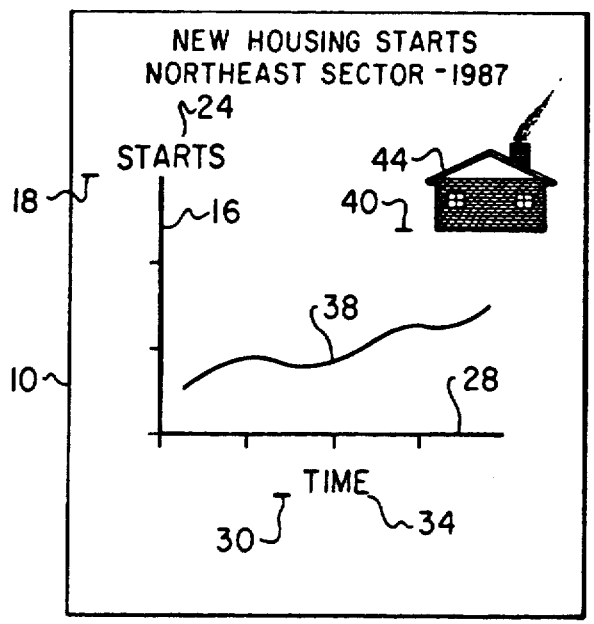

*Fig. 1*

```
                            ┌─12
BEGIN DOCUMENT
• • •                    ┌14
BEGIN GRAPHICS OBJECT
• • •
DRAW Y AXIS
   SET XY POSITION          ┌22
20┐BEGIN TEXT OBJECT<INHERIT>
   • • •
   'STARTS'
   END TEXT OBJECT~26
DRAW X AXIS
   SET XY POSITION
32┐BEGIN TEXT OBJECT<INHERIT>
   • • •
   'TIME'
   END TEXT OBJECT~36
DRAW PLOT LINE
   SET XY POSITION
42~BEGIN IMAGE OBJECT<INHERIT>
   • • •
   RASTER PATTERN OF HOUSE
46┘~END IMAGE OBJECT
   • • •
48┘~END GRAPHICS OBJECT
END DOCUMENT
```

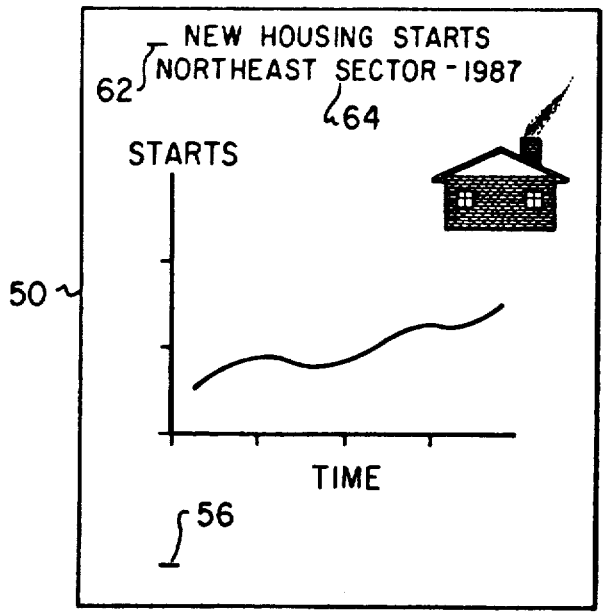

*Fig. 2*

```
                         ┌52
BEGIN DOCUMENT
• • •                    ┌54
BEGIN GRAPHICS OBJECT
• • •
SET XY POSITION          ┌60
58┐BEGIN TEXT OBJECT<INHERIT>
• • •
SET XY POSITION
'NEW HOUSING STARTS
NORTHEAST SECTOR -1987'
66┐END TEXT OBJECT
   ┌END GRAPHICS OBJECT
68┘END DOCUMENT
```

METHOD OF NESTING AND PROCESSING MIXED DATA OBJECTS WITHIN A DATA STREAM UTILIZING SELECTIVE ENVIRONMENT INHERITANCE

BACKGROUND OF THE INVENTION

1. Technical Field

This invention relates in general to digital communications and in particular to the transmission and processing of data streams. Still more particularly, this invention relates to the processing of nested mixed data objects within a data stream.

2. Background Art

In traditional revisable document architecture systems, the mixing of data from diverse data types has been limited to that which may be accomplished by placing the data into spaces that exist within a document layout. This placement rarely provides the granularity of positioning which is needed to handle mixing of elements from one data type into the coordinate space of a second data type. Examples of such a mixture is the utilization of text to satisfy the requirements of labeling the axes of graphic drawings or the drawing of rectangles around text in a prose section. These data instances are generally referred to as "special cases" because it is rare that the full data processing potential normally associated with text data is available for utilization in the first example and with graphics data in the second example. For example, text which has been inserted into a graphic document to label the axes thereof is generally not available for word processing or spell checking by a text editor application.

Additionally, placement of a mixed data type at the layout level also generates a problem due to the possibility of having to transform between different coordinate systems and units of measure, such as those provided by the data objects for the diverse data type elements which must be positioned into the data object space. Such positioning is further complicated by the absence of an explicit means to preserve the current position established in the coordinate space of a data object.

Correlation of objects by position specification has been attempted by utilizing an architected solution which directly mirrors these relationships. The utilization of a Document Content Architecture (DCA), which provides a wide variety of positioning capabilities has been attempted to satisfy the document composition requirements that exist in such mixed object documents. Although each data object in this system has its own coordinate space definition which may be offset from its associated object area, the data object coordinate space and its associated object area are identical in terms of orientation, extent and size and origin so that a data object may be positioned relative to all coordinate spaces in which the data object may be nested. While this technique represents one attempt at solving the aforementioned problem, it does not address the additional complexities which occur when multiple mixed data objects are combined within a data stream. For example, the environment of a particular data object may include additional features beyond the coordinate system; such as, unit of measure, color, or font.

Still another attempt at permitting a data stream to include multiple mixed data objects utilizes the establishment of a composite environment which is created as an outside environment specification. Thereafter, modifications to this outside environment specification are made by adding or subtracting environment specifications from the specification. While this technique permits a data stream with mixed data objects to more easily specify the environment elements for each object, it does not enhance the capability of the user to efficiently nest a plurality of mixed data objects while passing environment elements from one data object to a second data object.

SUMMARY OF THE INVENTION

It is therefore one object of the present invention to provide an improved method of nesting mixed data objects within a data stream.

It is another object of the present invention to provide an improved method of nesting mixed data objects within a data stream which permits efficient processing of those data objects.

It is yet another object of the present invention to provide an improved method of nesting mixed data objects within a data stream which permits efficient processing of those objects while allowing environmental elements of one data object to be utilized in conjunction with the processing of a second data object.

The foregoing objects are achieved as is now described. For purposes of this disclosure a nesting object is one that contains one or more complete objects either directly or indirectly by reference to a resource data object. A nested object is one that is contained completely within another object either directly by appearing within an object or indirectly by being referenced from within an object. Each mixed data object in a data stream in accordance with the present invention includes a pair of object delimiters which identify the beginning and end of that object, and an environment control indicator which determines whether that object will inherit environment elements from a nesting object or pass environment elements to a nesting object. An appropriate application for processing each object is called in response to the detection of the beginning of that object and is returned to after any intervening objects have been processed. Processing is accomplished utilizing environment elements from the current object or a previous object so that coordinate systems, color, units of measure or current positions may be shared between objects while allowing specific applications suited to a particular object to be utilized for processing.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

FIG. 1 depicts a pictorial representation of a computer display incorporating a plurality of mixed data objects, and an associated data stream wherein nested objects inherit environment elements from nesting objects;

FIG. 2 depicts a pictorial representation of a computer display incorporating a plurality of mixed data objects, and an associated data stream wherein nested objects replace portions of the environment inherited from nesting objects;

DETAILED DESCRIPTION OF THE PREFERRED EMBODIMENT

Figure 3:
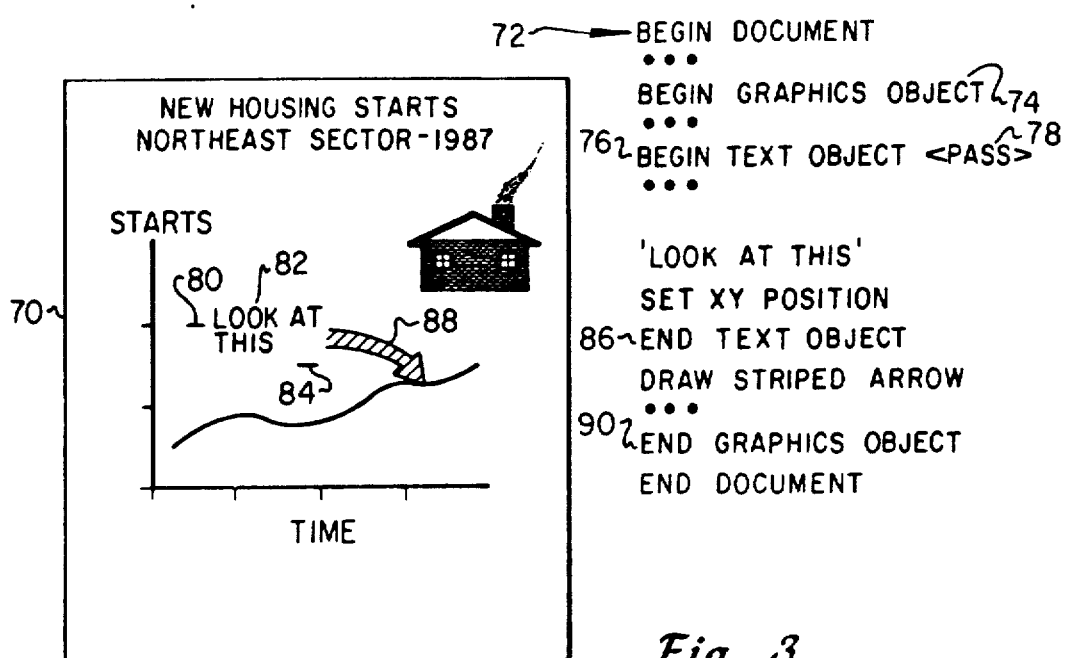
FIG. 3 depicts a pictorial representation of a computer display incorporating a plurality of mixed data objects, and an associated data stream wherein nested objects pass environment elements to nesting objects.

With reference now to the figures and in particular with reference to FIG. 1, there is depicted a pictorial representation of a computer display 10 which incorporates a plurality of mixed data objects, and an associated data stream 12. As can be seen, after beginning the document, data stream 12 includes a delimiter 14 "BEGIN GRAPHICS OBJECT" which indicates the start of a graphics object, and the calling of an appropriate graphics application to process that object. After drawing Y axis 16 and setting XY position 18, delimiter 20 "BEGIN TEXT OBJECT" is utilized to indicate the start of a text object which is nested within the graphics object begun at delimiter 14.

One important feature of the present invention is the utilization of an environment control indicator 22 which, in accordance with the method of the present invention, is utilized to determine whether or not the text object will "INHERIT" specific environment elements from a previous object or "PASS" specific environment elements to a subsequent object. Next, text element 24, "STARTS", is added to display 10 at XY position 18, which is inherited from the environment of the previous graphics object and delimiter 26 is utilized to indicate the ending of the text object and the returning to the graphics object and its associated processor.

After drawing X axes 28 and setting XY position 30, delimiter 32 is utilized to indicate the start of a text object and the insertion of text element 34 "TIME" at the inherited position, as disclosed above. After ending the text object, as indicated at delimiter 36, the graphics object will provide plot line 38 and set XY position 40.

Finally, delimiter 42 is utilized to indicate the start of an image object which will "INHERIT" XY position 40 and provide at that location a raster pattern image of a house 44. Thereafter, delimiters 46 and 48 will be utilized to indicate the ending of the image object and graphics object respectively.

As can be seen, by nesting the mixed data objects within the data stream in accordance with the present invention, it is possible to efficiently process a plurality of nested mixed data objects by calling appropriate processing applications in accordance with the type of object which must be processed at any given point within the data stream.

Referring now to FIG. 2, there is depicted a pictorial representation of a computer display 50 which incorporates a plurality of mixed data objects, and an associated data stream 52. As is illustrated, after delimiter 54 indicates the beginning of a graphics object and the setting of XY position 56, delimiter 58 is utilized to mark the beginning of a text object which will "INHERIT" specific environment elements of the graphics object, as indicated by environment control indicator 60.

In accordance with one feature of the present invention, the text object may now set a new XY position 62 which may be utilized to mark the beginning of text element 64. Thus, the text object may inherit the environment of the previous graphics object while replacing the position element therein. Any remaining environment elements (i.e. color) will remain as specified in the graphics object. Thereafter, delimiter 66 and 68 are utilized to indicate the end of the text object and graphics object respectively.

With reference now to FIG. 3, there is depicted a pictorial representation of a computer display 70 which incorporates a plurality of mixed data objects, and an associated data stream 72. In this example of the present invention, one nested object may pass specific environment elements to a subsequent object. After beginning the graphics object, as indicated by delimiter 74, delimiter 76 indicates the beginning of a text object while environment control indicator 78 indicates that an environment element from the text object will be "PASSED" to a subsequent object.

As can be seen, after setting XY position 80, the text object inserts text element 82 and sets XY position 84. Delimiter 86 indicates the ending of the text object and the graphics object is then utilized to insert striped arrow 88 at XY position 84, as passed from the text object. Thereafter, delimiter 90 ends the graphics object as discussed above. In this manner, it is possible to utilize the method of the present invention to permit one nested object to pass specific environment elements from that object to a subsequent object in the data stream.

Figure 4:
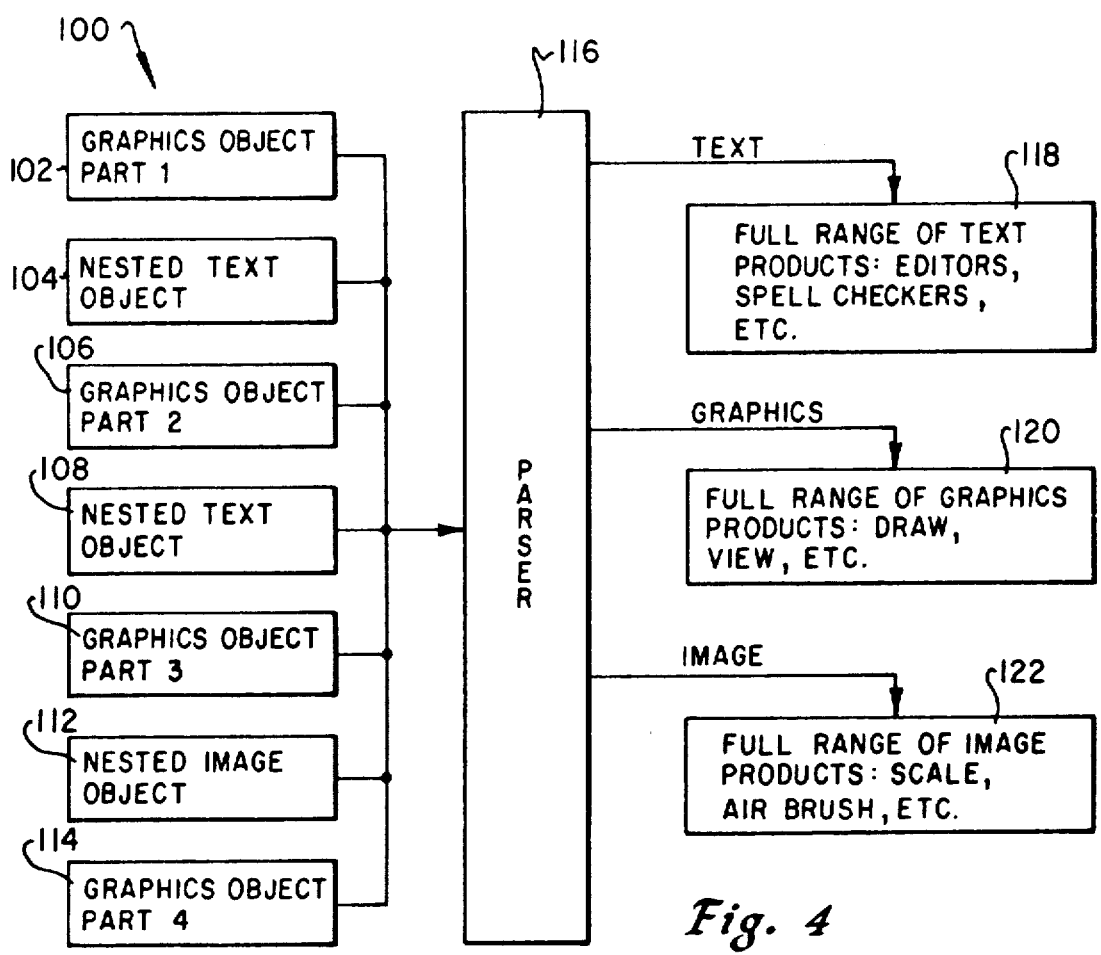
FIG. 4 is a block diagram of a data stream parser which may be utilized in conjunction with the present invention.

Referring now to FIG. 4, there is depicted a block diagram of a data stream 100, which incorporates a plurality of nested mixed objects including: a graphics object which is present in four portions, 102, 106, 110, and 114; nested text objects 104 and 108; and nested image object 112. As can be seen, data stream 100 is coupled to parser 116 which is provided to detect the delimiters which are utilized to mark the beginning and end of each nested data object, including any environment control indicator which may be present.

In accordance with the method of the present invention, parser 116 is then utilized to couple all text objects within data stream 100 to text processor applications 118, whereby various editors, spellers, or other text processing applications may be utilized. All graphics objects within data stream 100 are coupled by parser 116 to graphics processor applications 120, wherein various graphics applications may be applied to those portions of data stream 100. Finally, all image objects within data stream 100 may be coupled by parser 116 to image processor applications 122 so that the image objects may be efficiently processed.

Figure 5:
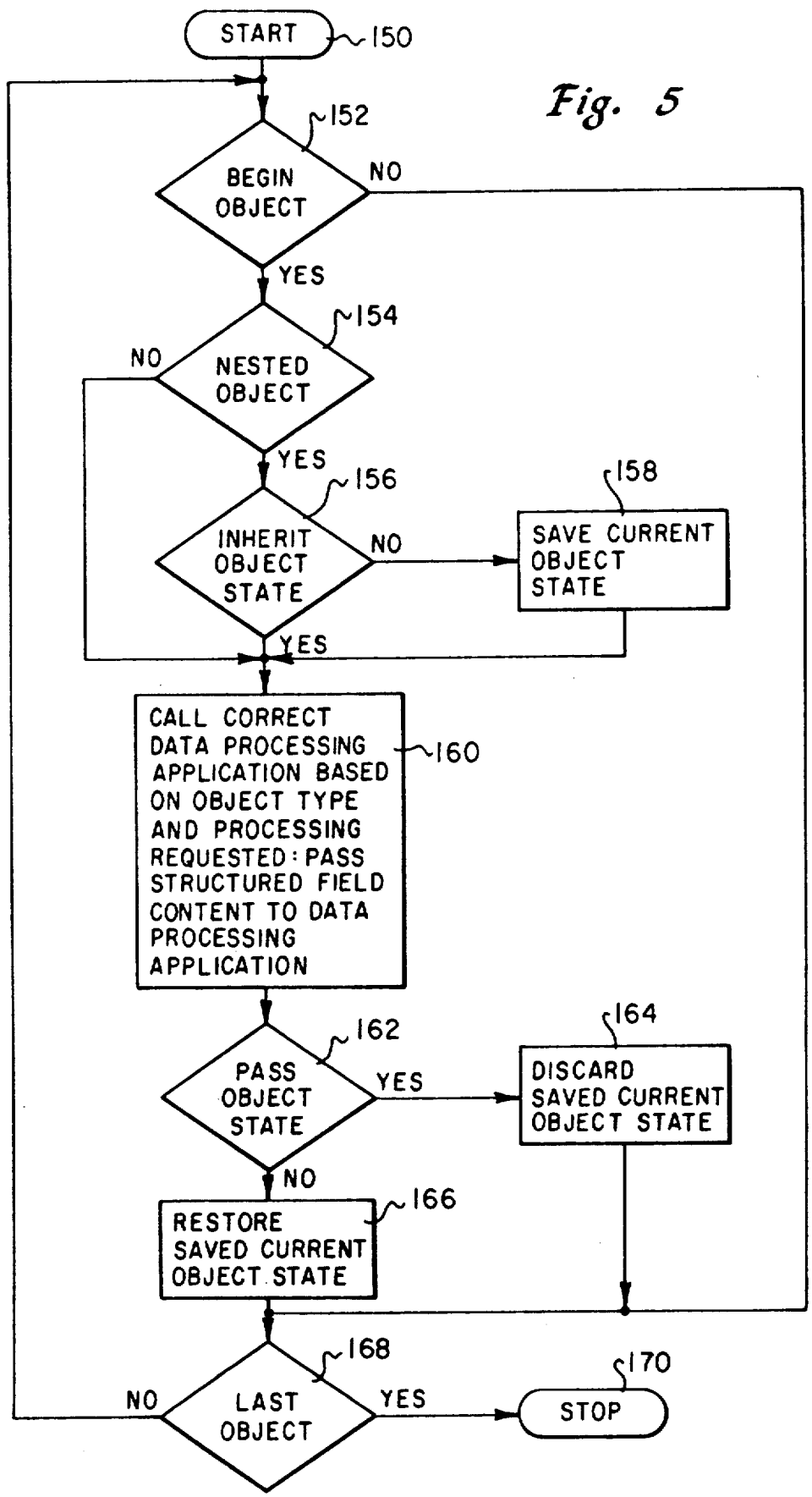
FIG. 5 is a logic flow diagram demonstrating the processing of a data stream having mixed nested data objects in accordance with the present invention.

Finally, with reference to FIG. 5, there is depicted a logic flow diagram demonstrating the processing of a data stream having mixed nested data objects in accordance with the present invention. As can be seen, after starting as indicated in block 150, block 152 is utilized to determine whether or not a delimiter indicating the beginning of a data object has been detected. If not, the process utilizes block 168 to determine whether or not the last object processed is the last object in the data stream and if so, the program stops as indicated at block 170. If the last object encountered is not the last object in the data stream, the program returns to block 152 to determine whether or not a delimiter indicating the beginning of the next data object has been detected.

Once a delimiter indicating the beginning of a data has been detected, block 154 is utilized to determine whether or not the object within the data stream includes a nested object therein. If not, block 160 illustrates the calling of the correct data processing application, based upon the object type encountered, and the processing of the elements of the data object as requested. Thereafter, the structured field content is passed to the data processing application.

Returning now to block 154, if the object presently in question includes a nested object, block 156 is utilized to determine whether or not the nested object will inherit any of the specific environment elements of the previous object. If not, the current object state is saved, as illustrated in block 158. If the nested data object will inherit specific environment elements of the previous object, block 160 is then utilized again to call the correct data processing application and process the elements of the object as requested.

Thereafter, block 162 is utilized to determine whether or not the object in question will pass specific portions of its environment elements to a subsequent object within the data stream. If not, block 166 indicates the restoring of the saved current object state. If the present object is to pass selected portions of its environment to a subsequent object, block 164 depicts the disregarding of the saved current state for the present object and thereafter block 168 is again utilized to determine whether or not the object in processing is the last object within the data stream. If so, the program ends at block 170. If not, the program will return to block 152 to begin again.

As can be seen, by utilizing the method of the present invention, it is possible to nest a full range of mixed data objects within a data stream and provide each of those objects with a full range of processing applications. Additionally, the method of the present invention permits selected objects within the data stream to inherit from previous objects certain of the environment elements which may be utilized to more efficiently process the relationship between two mixed data objects. Similarly, the method of the present invention permits one data object within the data stream to pass a selected portion of its environment elements to a subsequent object for utilization in a joint processing.

While the invention has been particularly shown and described with reference to a preferred embodiment, it will be understood by those skilled in the art that various changes in form and detail may be made therein without departing from the spirit and scope of the invention.

We claim:

1. A computer implemented method in data processing system for nesting and processing a plurality of mixed data objects of diverse data object type which may include text data objects, graphics data objects and image data objects, each diverse data object type of said plurality of mixed data objects requiring a selected data processing application for processing thereof and having a beginning and an ending, said method comprising the steps of:

nesting a plurality of mixed data objects within a data stream in said data processing system such that at least one data object type is contained completely within a second data object type;

marking the beginning of each of said plurality of nested mixed data objects, said marking including an indication of data object type;

marking the end of each of said plurality of nested mixed data objects;

calling a first selected data processing application for processing a first one of said plurality of nested mixed data objects in response to a detection of the beginning thereof;

temporarily halting said first selected data processing application and thereafter calling a second selected data processing application for processing a second one of said plurality of nested mixed data objects in response to a detection of the beginning thereof; and thereafter halting said second selected data processing application and returning to said first selected processing application in response to a detection of the ending of said second one of said plurality of nested mixed data objects.

2. The computer implemented method in a data processing system of nesting and processing a plurality of mixed data objects according to claim 1, wherein said step of marking the ending of each of said plurality of nested mixed data objects includes marking an indication of data object type.

3. A computer implemented method in a data processing system of nesting and processing a plurality of mixed data objects of diverse data object type which may include text data objects, graphics data objects and image data objects, each diverse data object type of said plurality of mixed data objects having a beginning and an ending and specific environment elements associated therewith and requiring a selected data processing application for processing thereof, said method comprising the steps of:

nesting a plurality of mixed data objects within a data stream in said data processing system such that at least one data object type is contained completely within a second data object type;

marking the beginning of each said plurality of nested mixed data objects, said marking including an indication of data object type;

marking each of said plurality of nested mixed data objects with an environment control indication indicating specific environment elements which will be inherited from a nesting mixed data object;

marking the ending of each of said plurality of nested mixed data objects;

calling a first selected data processing application for processing a first one of said plurality of nested mixed objects in response to a detection of the beginning thereof;

temporarily halting said first selected data processing application and thereafter calling a second selected data processing application for processing a second one of said plurality of nested mixed data objects, in accordance with said specific environment elements of said first one of said plurality of nested mixed data objects, in response to a detection of the beginning of said second one of said plurality of nested mixed data objects and said environment control indication; and thereafter halting said second selected data processing application and returning to said first selected data processing application in response to a detection of the ending of said second one of said plurality of nested mixed data objects.

4. The computer implemented method in a data processing system of nesting and processing a plurality of mixed data objects according to claim 3, wherein said step of marking the ending of each of said plurality of nested mixed data objects includes marking an indication of data object type.

5. The computer implemented method in a data processing system of nesting and processing a plurality of mixed data objects according to claim 3, wherein said specific environment elements include a coordinate system associated with at least one of said plurality of nested mixed data objects and wherein said environment control indication includes a determination of a current position of a data object.

6. A computer implemented method inn a data processing system of nesting and processing a plurality of mixed data objects of diverse data object type which may include text data objects, graphics data objects and image data objects, each diverse data object type of said plurality of mixed data objects having a beginning and an ending and specific environment elements associated therewith and requiring a selected data processing application for processing thereof, said method comprising the steps of:
- nesting a plurality of mixed data objects within a data stream in said data processing system such that at least one data object type is contained completely within a second data object type;
- marking the beginning of each of said plurality of nested mixed data objects, said marking including an indication of data object type;
- marking each of said plurality of nested mixed data objects with an environment control indication indicating specific environment elements which will be passed from a nested mixed data object;
- marking the ending of each of said plurality of nested mixed data objects;
- calling a first selected data processing application for processing a first one of said plurality of nested mixed data objects in response to a detection of the beginning thereof;
- temporarily halting said first selected data processing application and thereafter calling a second selected data processing application for processing a second one of said plurality of nested mixed data objects in response to a detection of the beginning thereof; and
- thereafter halting said second selected data processing application and returning to said first selected data processing application and processing at least a portion of said first one of said plurality of nested mixed data objects in accordance with said specific environment elements of said second one of said plurality of nested mixed data objects in response to a detection of the ending of said second one of said plurality of nested mixed data objects and said environment control indication.

7. The computer implemented method in a data processing system of nesting and processing a plurality of mixed data objects according to claim 6, wherein said step of marking the ending of each of said plurality of nested mixed data objects includes marking an indication of data object type.

8. The computer implemented method in a data processing system of nesting and processing a plurality of mixed data objects according to claim 6, wherein said specific environment elements include a coordinate system associated with at least one of said plurality of nested mixed data objects and wherein said environment control indication includes a determination of a current position of a data object.

9. A data processing system for nesting and processing a plurality of mixed data objects of diverse data object type which may include text data objects, graphics data objects and image data objects, each diverse data object type of said plurality of mixed data objects requiring a selected data processing application for processing thereof and having a beginning and an ending, said data processing system comprising:
- means for nesting a plurality of mixed data objects within a data stream in said data processing system such that at least one data object type is contained completely within a second data object type;
- means for marking the beginning of each of said plurality of nested mixed data objects, said marking including an indication of data object type;
- means for marking the ending of each of said plurality of nested mixed data objects;
- means for calling a first selected data processing application for processing a first one of said plurality of nested mixed data objects in response to a detection of the beginning thereof;
- means for temporarily halting said first selected data processing application and thereafter calling a second selected data processing application for processing a second one of said plurality of nested mixed data objects in response to a detection of the beginning thereof; and
- means for thereafter halting said second selected data processing application and returning to said first selected data processing application in response to a detection of the ending of said second one of said plurality of nested mixed data objects.

10. The data processing system for nesting and processing a plurality of mixed data objects according to claim 9, wherein said means for marking the ending of each of said plurality of nested mixed data objects includes means for marking an indication of data object type.

* * * * *